United States Patent
Nakayoshi et al.

(10) Patent No.: US 7,161,641 B2
(45) Date of Patent: Jan. 9, 2007

(54) DEVICE WITH UPPER CONDUCTIVE ELEMENT, LOWER CONDUCTIVE ELEMENT, AND INSULATING ELEMENT

(75) Inventors: Yoshiaki Nakayoshi, Ooamishirasato (JP); Nagatoshi Kurahashi, Mobara (JP); Tetsuya Kawamura, Mobara (JP); Kazuhiko Yanagawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/963,719

(22) Filed: Oct. 14, 2004

(65) Prior Publication Data

US 2005/0046773 A1 Mar. 3, 2005

Related U.S. Application Data

(63) Continuation of application No. 10/270,664, filed on Oct. 16, 2002, now abandoned.

(30) Foreign Application Priority Data

Nov. 13, 2001 (JP) ............................... 2001-347190

(51) Int. Cl.
*G02F 1/136* (2006.01)
*G02F 1/1343* (2006.01)

(52) U.S. Cl. ........................ 349/43; 349/46; 349/141

(58) Field of Classification Search ................ 349/43, 349/141, 46, 114
See application file for complete search history.

(56) References Cited

U.S. PATENT DOCUMENTS

| | | | |
|---|---|---|---|
| 5,852,481 A * | 12/1998 | Hwang | 349/43 |
| 6,038,002 A | 3/2000 | Song | |
| 6,157,422 A | 12/2000 | Fujikawa | |
| 6,208,399 B1 | 3/2001 | Ohta et al. | |

FOREIGN PATENT DOCUMENTS

KR  1994-0003077  7/1992

* cited by examiner

*Primary Examiner*—James A. Dudek
(74) *Attorney, Agent, or Firm*—Reed Smith LLP; Stanley P. Fisher, Esq.; Juan Carlos A. Marquez, Esq.

(57) ABSTRACT

A liquid crystal display device comprising a pair of substrates with liquid crystal layer therebetween, a plurality of gate signal lines and a plurality of drain signal lines formed on one of the pair of substrates, at least a pixel electrode and a plurality of counter electrodes formed on the one of the pair of substrates in each pixels, at least one of the plurality of counter electrodes extend along a drain signal line overlapping to the drain signal lines with at least one of an insulation film therebetween, and the drain signal line has two or more regions which differ in distance between a surface of the drain signal line and the counter electrode.

16 Claims, 7 Drawing Sheets

DEVICE WITH UPPER CONDUCTIVE ELEMENT, LOWER CONDUCTIVE ELEMENT, AND INSULATING ELEMENT

CROSS REFERENCE TO RELATED APPLICATIONS

This application is a Continuation application of U.S. application Ser. No. 10/270,664 filed on Oct. 16, 2002 now abandoned. Priority is claimed based on U.S. application Ser. No. 10/270,664 filed on Oct. 16, 2002, which claims priority to Japanese Patent Application No. 2001-347190 filed on Nov. 13, 2001.

BACKGROUND OF THE INVENTION

1. Field of the Invention

The present invention relates to a liquid crystal display device, and more particularly to a so-called in-plane type liquid crystal display device.

2. Description of the Related Art

In a so-called in-plane type liquid crystal display device, a pair of substrates are arranged to face each other while sandwiching liquid crystal therebetween, a pixel electrode and a counter electrode which are disposed close to each other are formed on each pixel region provided to a liquid-crystal-side surface of one substrate out of the pair of substrates, and the behavior of the liquid crystal is controlled in response to parallel components of an electric field to the substrate which is generated between these electrodes.

As such a liquid crystal display device adopting an active matrix type, there has been known a liquid crystal display device in which, on the liquid-crystal side of one substrate, each pixel region is defined by a region which is surrounded by a plurality of gate signal lines which are arranged in parallel and a plurality of drain signal lines which cross the gate signal lines and are arranged in parallel. Further, in each pixel region, a thin film transistor which is operated in response to a scanning signal from the gate signal line, a pixel electrode to which a video signal is supplied from the drain signal line through the thin film transistor, and a counter electrode to which a voltage signal constituting reference with respect to the video signal is supplied are formed.

Then, the pixel electrode and the counter electrode are respectively formed in a strip shape extending in one direction and they are formed of a group consisting of a plurality of electrodes in which the pixel electrode and the counter electrode are arranged alternately.

Further, in such a constitution, there has been known the counter electrodes which are formed such that the counter electrodes are overlapped to the drain signal lines in the running direction of the drain signal lines by way of an insulation film.

A line of electric force of the electric field from the drain signal line is configured to be terminated to the counter electrode which is formed to be overlapped to the drain signal line, while the line of electric force of the electric field is configured to be not terminated to the pixel electrode which is arranged close to the counter electrode. This is because that when the line of electric force of the electric field is terminated to pixel electrode, this generates noises.

SUMMARY OF INVENTION

However, with respect to the liquid crystal display device having such a constitution, to make the counter electrode have the above-mentioned function, it is necessary to form the counter electrode such that a width thereof is larger than a width of the drain signal line.

Accordingly, capacitance of the drain signal line with respect to the counter electrode (parasitic capacitance) is increased and hence, it has been pointed out that the delay of waveform is generated with respect to the video signal supplied to the drain signal line.

In this case, the delay of waveform of the drain signal line is proportional to a product of resistance R of the drain signal line and the parasitic capacitance C. Then, to improve the delay, it is effective that making at least one of the resistance R and the parasitic capacitance C to be small.

However, in case that the counter electrode is present above the drain signal line, even when the width of the drain signal line is increased so as to reduce the resistance R of the drain signal line, the parasitic capacitance C thereof with the counter electrode is increased corresponding to the reduction of the resistance R and, as a result, there arises a situation that the delay of waveform cannot be reduced. In other words, there are trade-off relation.

The present invention has been made in view of such circumstances and one advantage of the present invention lies in the reduction of a capacitance of a drain signal line with respect to a counter electrode.

To briefly explain the summary of typical inventions among the inventions disclosed in the present application, they are as follows.

(1)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of drain signal lines which cross the gate signal lines and are arranged in parallel are formed;

regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that the drain signal line has regions which differ in at least two or more stages with respect to a distance between a surface of the drain signal line which faces the counter electrode and the counter electrode.

(2)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of drain signal lines which cross the gate signal lines and are arranged in parallel are formed;

regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that a taper which is flared toward a ground layer side of the drain signal line is formed on at least a side wall face of one of respective sides in the running direction of each drain signal line.

(3)

A liquid crystal display device according to the present invention is, for example, characterized in that:

on a liquid-crystal-side surface of one substrate of respective substrates which are arranged to face each other in an opposed manner while sandwiching liquid crystal there between, a plurality of gate signal lines which are arranged in parallel and a plurality of two-layered conductive drain signal lines which cross the gate signal lines and are arranged in parallel are formed;

regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that a taper which is flared toward a ground layer side of the drain signal line is formed on at least a side wall face of one of respective sides in the running direction of a conductive layer which constitutes a lower layer side of the drain signal line.

(4)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of drain signal lines which cross the gate signal lines and are arranged in parallel are formed;

the drain signal line has a two-layered structure including a conductive layer which constitutes a lower layer made of Al or an alloy thereof;

regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that a taper which is flared toward a ground layer side of the drain signal line is formed on at least a side wall face of one of respective sides in the running direction of the conductive layer which constitutes the lower layer of the drain signal line.

(5)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of two-layered conductive drain signal lines which cross the gate signal lines and are arranged in parallel are formed;

regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that by etching a conductive layer which constitutes a lower layer of the drain signal line using a conductive film which constitutes an upper layer as a mask, tapers which are flared toward a ground layer side of the drain signal line are formed on side wall faces of the conductive film which constitutes the lower layer of the drain signal line.

(6)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of drain signal lines which cross the respective gate signal lines and are arranged in parallel are formed;

the drain signal line has a three-layered structure in which an intermediate layer is formed of a conductive layer made of Al or an alloy thereof and an uppermost layer and a lowermost layer are formed of conductive layers made of material other than Al or an alloy thereof, regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that a width of the conductive layer which constitutes the lowermost layer is wider than a width of the conductive layer which constitutes the uppermost layer, and a width of the conductive layer which constitutes the intermediate layer is changed from the width of the conductive layer which constitutes the lowermost layer to the width of the conductive layer which constitutes the uppermost layer.

(7)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of drain signal lines which cross the gate signal lines and are arranged in parallel are formed;

the drain signal line has a three-layered structure in which an intermediate layer is formed of a conductive layer made of Al or an alloy thereof and an uppermost layer and a lowermost layer are formed of conductive layers made of material other than Al or an alloy thereof, regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes which generate electric fields between the pixel electrodes and the counter electrodes are formed on the pixel region; and the counter electrodes include the counter electrodes which extend in the running direction of the drain signal lines by way of an insulation film and are overlapped to the drain signal lines, and the drain signal lines are constituted such that a width of the conductive layer which constitutes the lowermost layer is wider than a width of the conductive layer which constitutes the uppermost layer, and a width between side wall surfaces of the conductive layer which constitutes the intermediate layer is changed from the width of the conductive layer which constitutes the lowermost layer to the width of the conductive layer which constitutes the uppermost layer, and oxide films are formed on the side wall surfaces.

(8)

A liquid crystal display device according to the present invention is, for example, characterized in that:

on a liquid-crystal-side surface of one substrate of respective substrates which are arranged to face each other in an opposed manner while sandwiching liquid crystal therebetween, a plurality of gate signal lines which are arranged in parallel and a plurality of drain signal lines which cross the gate signal lines and are arranged in parallel are formed;

regions which are surrounded by the respective signal lines constitute pixel regions, and a thin film transistor which is operated in response to scanning signals from the gate signal lines, pixel electrodes to which video signals are supplied from the drain signal lines through the thin film transistor, and counter electrodes to which signals which constitute a reference with respect to the video signals are supplied through counter voltage signal lines,are formed on each pixel region; and the counter voltage signal lines include the counter voltage signal lines which extend in the running direction of the gate signal lines by way of an insulation film and are overlapped to the gate signal lines, and the gate signal lines are constituted such that a taper which is flared toward a ground layer side of the gate signal line is formed on at least a side wall face of one of respective sides in the running direction of each gate signal line.

(9)

A liquid crystal display with a pair of substrates with liquid crystal layer therebetween, a plurality of gate signal lines and a plurality of drain signal lines formed on one of the pair of substrates; at least a pixel electrode and a plurality of counter electrodes formed on the one of the pair of substrates in each pixels, wherein at least one of the plurality of counter electrodes extend along a drain signal line overlapping to the drain signal lines with at least one of an insulation film therebetween, and the drain signal line has two or more regions which differ in distance between a surface of the drain signal line and the counter electrode.

(10)

A liquid crystal display device with a pair of substrates with liquid crystal layer therebetween, a plurality of gate signal lines and a plurality of drain signal lines formed on one of the pair of substrates, at least a pixel electrode and a plurality of counter electrodes formed on the one of the pair of substrates in each pixels, wherein at least one of the plurality of counter electrodes extend along a drain signal line overlapping to the drain signal lines with at least one of an insulation film therebetween, the drain signal line has at least a taper portion in a cross section view at width direction of the drain signal line.

(11)

A liquid crystal display device according to (10), a width of the drain signal line is wider at a substrate side of the drain signal line formed thereon than a liquid crystal layer side.

(12)

A liquid crystal display device according to (10), the drain signal line have a multiplayer structure of a lower layer faced to the substrate and an upper layer,and the width of the lower layer is wider than a width of the upper layer.

(13)

A liquid crystal display device with a pair of substrates with liquid crystal layer therebetween, a plurality of gate signal lines and a plurality of drain signal lines formed on one of the pair of substrates, at least a pixel electrode and a plurality of counter electrodes formed on the one of the pair of substrates in each pixels, wherein the drain signal line has a three-layered structure in which an intermediate layer is formed of a conductive layer made of Al or an alloy thereof and an uppermost layer and a lowermost layer are formed of conductive layers made of material other than Al or an alloy thereof, at least one of the plurality of counter electrodes extend along a drain signal line overlapping to the drain signal lines with at least one of an insulation film therebetween, and width of the lowermost layer is wider than a width of the uppermost layer, and a width of the intermediate layer gradually change its from the width of the lowermost layer to the width of the uppermost layer.

(14)

A liquid crystal display device according to (13), oxide films formed on the side wall of the surface of the intermediate layer.

(15)

A liquid crystal display device with a pair of substrates with liquid crystal layer therebetween, a plurality of gate signal lines and a plurality of drain signal lines formed on one of the pair of substrates, at least a pixel electrode and a plurality of counter electrodes formed on the one of the pair of substrates in each pixels, at least one of the plurality of counter electrodes extend along a gate signal line overlapping to the gate signal lines with at least one of an insulation film therebetween, the gate signal line has at least a taper portion in a cross section view at width direction of the gate signal line.

(16)

A liquid crystal display device according to (15), a width of the gate signal line is wider at a substrate side of the gate signal line formed thereon than a liquid crystal layer side.

(17)

A liquid crystal display device according to (15), the gate signal line have a multiplayer structure of a lower layer faced to the substrate and an upper layer,and the width of the lower layer is wider than a width of the upper layer.

(18)

A liquid crystal display device with a pair of substrates with liquid crystal layer therebetween, a plurality of gate signal lines and a plurality of drain signal lines formed on one of the pair of substrates, at least a pixel electrode and a plurality of counter electrodes formed on the one of the pair of substrates in each pixels, the gate signal line has a three-layered structure in which an intermediate layer is formed of a conductive layer made of Al or an alloy thereof and an uppermost layer and a lowermost layer are formed of conductive layers made of material other than Al or an alloy thereof, at least one of the plurality of counter electrodes extend along a gate signal line overlapping to the gate signal lines with at least one of an insulation film therebetween, and width of the lowermost layer is wider than a width of the uppermost layer, and a width of the intermediate layer gradually change its from the width of the lowermost layer to the width of the uppermost layer.

(19)

A liquid crystal display device according to (18), oxide films formed on the side wall of the surface of the intermediate layer.

DETAILED DESCRIPTION OF THE PREFERRED EMBODIMENTS

Preferred embodiments of a liquid crystal display device according to the present invention is explained hereinafter in conjunction with drawings.

Embodiment 1

<<Equivalent Circuit>>

Figure 2:
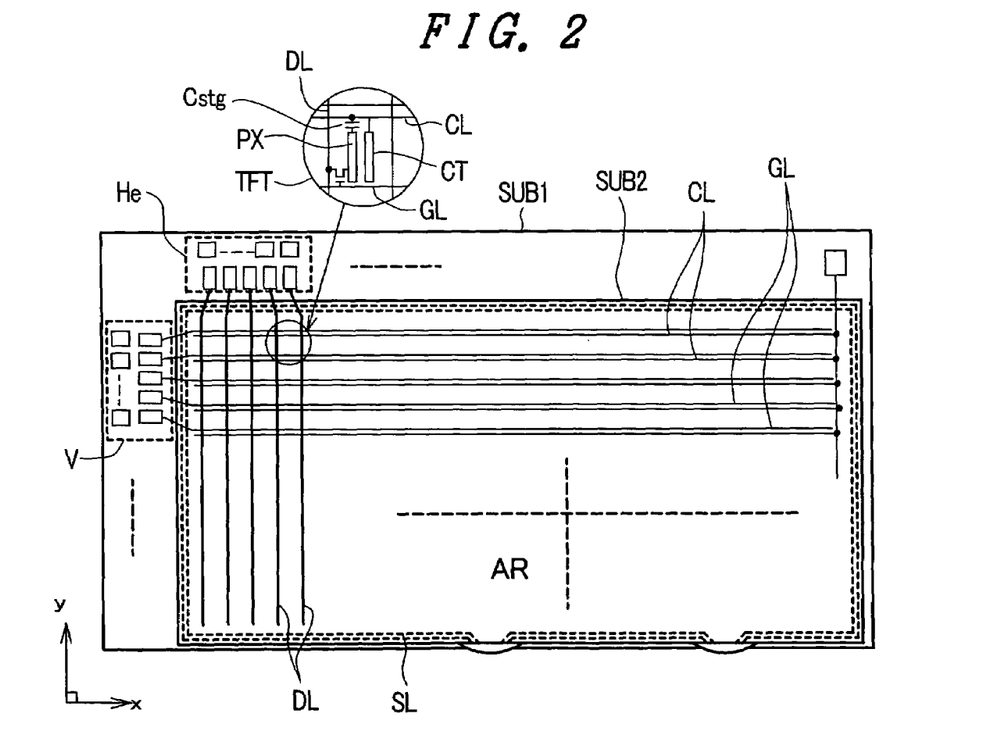
FIG. 2 is an equivalent circuit diagram showing one embodiment of the liquid crystal display device according to the present invention.

FIG. 2 is an equivalent circuit diagram showing one embodiment of a liquid crystal display device according to the present invention. Although FIG. 2 is the circuit diagram, the drawing is depicted in accordance with an actual geometric arrangement.

In the drawing, a pair of transparent substrates SUB1, SUB2 which are arranged to face each other in an opposed manner while sandwiching liquid crystal therebetween are provided, wherein the liquid crystal is sealed by a sealing material SL which also has a function of fixing the other transparent substrate SUB2 to one transparent substrate SUB1.

On a liquid-crystal-side surface of one transparent substrate SUB1 which is surrounded by the sealing material SL, gate signal lines GL which extend in the x direction and are arranged in parallel in the y direction and drain signal lines DL which extend in the y direction and are arranged in parallel in the x direction are formed.

A region which is surrounded by respective gate signal lines GL and respective drain signal lines DL constitutes a pixel region and a mass of these pixel regions in a matrix array constitute a liquid crystal display part AR.

Further, common counter voltage signal lines CL which run in respective pixel regions are formed in respective pixel regions which a rearranged in parallel in the x direction. These counter voltage signal lines CL constitute signal lines which supply a voltage which is used as reference with respect to a video signal to counter electrodes CT in respective pixel regions which will be explained later.

On each pixel region, a thin film transistor TFT which is operated in response to a scanning signal from the one-side gate signal line GL and a pixel electrode PX to which a video signal is supplied from the one-side drain signal line DL through the thin film transistor TFT are formed.

The pixel electrode PX generates an electric field between the pixel electrode PX and the counter electrode CT which is connected to the counter voltage signal line CL and the optical transmissivity of the liquid crystal is controlled in response to this electric field.

Respective one ends of the gate signal lines GL extend over the sealing material SL and the extending ends constitute terminals to which output terminals of a vertical scanning driving circuit V are connected. Further, to input terminals of the vertical scanning driving circuit V, signals from a printed circuit board which is arranged outside the liquid crystal display panel are inputted.

The vertical scanning driving circuit V is constituted of a plurality of semiconductor devices. A plurality of gate signal lines GL which are arranged close to each other are formed into a group. One semiconductor device is allocated to each group.

In the same manner, respective one ends of the drain signal lines DL extend over the sealing material SL and the extending ends constitute terminals to which output terminals of the video signal driving circuit He are connected. Further, input terminals of the video signal driving circuit He are configured to receive inputting of signals from a printed circuit board which is arranged outside the liquid crystal display panel.

This video signal driving circuit He is also constituted of a plurality of semiconductor devices. A plurality of drain signal lines DL which are arranged close to each other are formed into a group. One semiconductor device is allocated to each group.

Further, the counter voltage signal lines CL are connected in common at a right-side end portion in the drawing, for example. A connection line extends over the sealing material SL and the extending end constitutes a terminal CLT. A voltage which constitutes the reference with respect to video signals is supplied from the terminal CLT.

The respective gate signal lines GL are sequentially selected one by one in response to the scanning signals from the vertical scanning circuit V.

Further, to respective drain signal lines DL, the video signal are supplied at the timing of selection of the gate signal lines GL from the video signal driving circuit He.

In the above-mentioned embodiment, the vertical scanning driving circuit V and the video signal driving circuit He are constituted of the semiconductor devices which are mounted on the transparent substrate SUB1. However, these driving circuits V and He may be constituted of so-called tape carrier type semiconductor devices which are connected astride between the transparent substrate SUB1 and the printed circuit board, for example. Further, when a semiconductor layer of the thin film transistor TFT is constituted of poly-crystalline silicon p-Si, semiconductor divices made of the poly-crystalline silicon may be formed on the transparent substrate SUB1 surface together with wiring layers.

<<Constitution of Pixel>>

Figure 1:
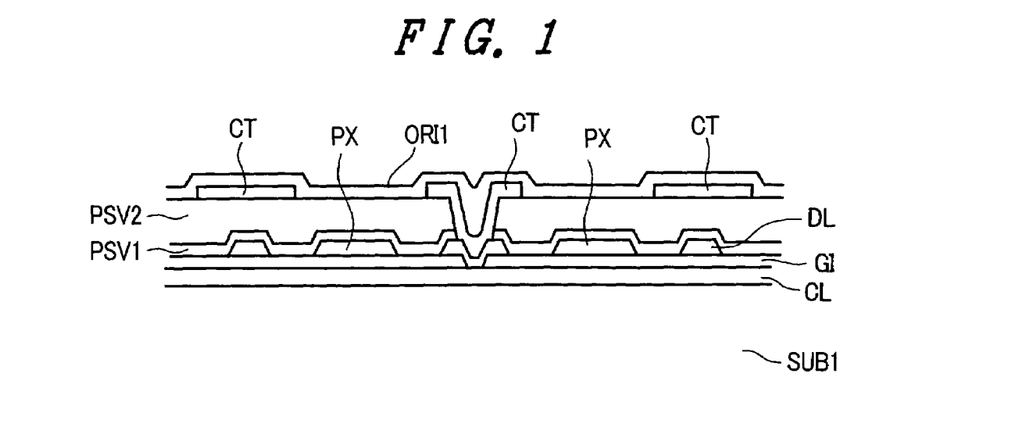
FIG. 1 is a cross-sectional view showing one embodiment of a pixel of a liquid crystal display device according to the present invention.
Figure 3:
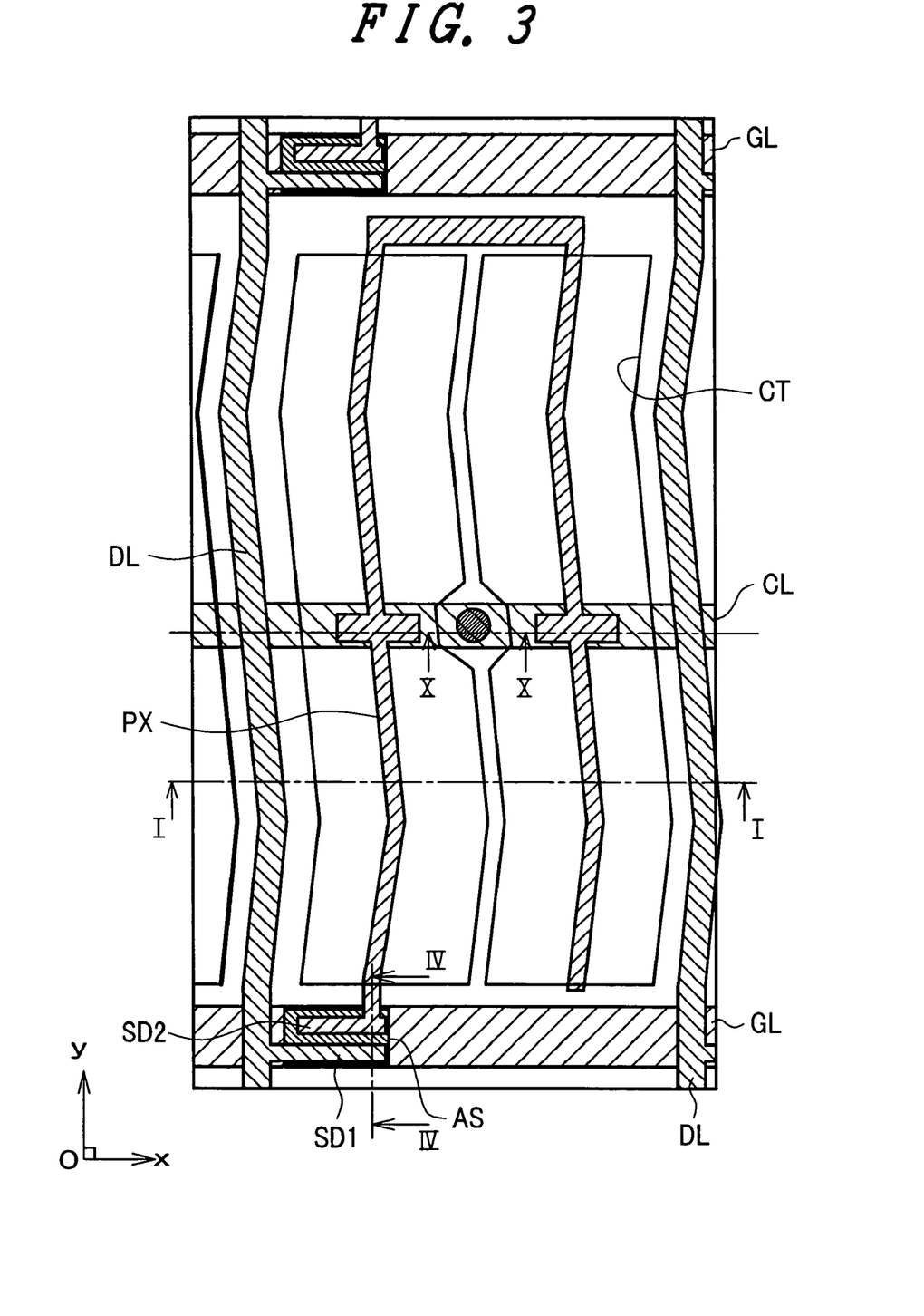
FIG. 3 is a plan view showing one embodiment of a pixel of a liquid crystal display device according to the present invention.
Figure 4:
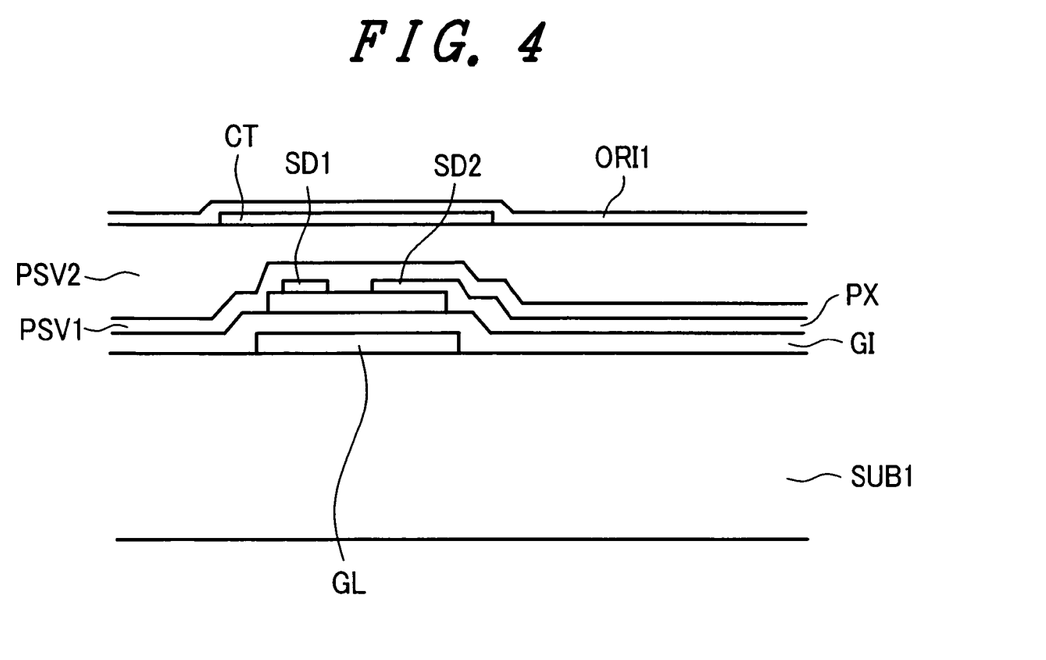
FIG. 4 is a cross-sectional view taken along a line IV—IV in FIG. 3.

FIG. 3 is a plan view showing one embodiment of the constitution of the pixel region. Further, FIG. 1 is a cross-sectional view taken along a line I—I in FIG. 3 and FIG. 4 is a cross-sectional view taken along a line IV—IV in FIG. 3.

In respective drawings, on a liquid-crystal-side surface of the transparent substrate SUB1, first of all, a pair of gate signal lines GL which extend in the x direction and are arranged in the y direction in parallel are formed.

These gate signal lines GL surround a rectangular region together with a pair of drain signal lines DL which are explained later and this region constitutes the pixel region.

Further, simultaneously with the formation of the gate signal lines GL, the counter voltage signal line CL which runs parallel to the gate signal lines GL at the center of each pixel region, for example, is formed.

On the surface of the transparent substrate SUB1 on which the gate signal lines GL and the counter voltage signal lines CL are formed in this manner, an insulation film GI made of SiN, for example, (see FIG. 1, FIG. 4) is formed such that the insulation film GI also covers the gate signal lines GL and the counter voltage signal lines CL.

The insulation film GI has a function of an interlayer insulation film for the gate signal lines GL in the regions where the drain signal lines DL which are explained later are formed, has a function of a gate insulation film in the regions where the thin film transistors TFT which will be explained later are formed, and has a function of one of dielectric films in regions where capacitive elements Cstg which will be explained later are formed.

Further, on a surface of the insulation film GI, semiconductor layers AS which are made of amorphous Si, for example, are formed such that the semiconductor layers AS are overlapped to portions of the gate signal lines GL.

Each semiconductor layer AS constitutes a semiconductor layer of the thin film transistor TFT. By forming a drain electrode SD1 and a source electrode SD2 on an upper surface of the semiconductor layer AS, it is possible to constitute a MIS type transistor having an inverse stagger structure which uses a portion of the gate signal line as a gate electrode.

Here, the drain electrode SD1 and the source electrode SD2 are formed simultaneously with the formation of the drain signal line DL.

That is, the drain signal lines DL which extend in the y direction and are arranged in parallel in the x direction are formed, then, portions of the drain signal lines DL are extended over the upper surfaces of the semiconductor layers AS so as to form the drain electrodes SD1, and the source electrodes SD2 are formed spaced apart from the drain electrodes SD1 by a length of a channel of the thin film transistor TFT.

Here, with respect to the drain signal line DL, tapers which are gradually widened toward the insulation film GI side of the drain signal line DL are formed on side wall faces of respective sides of the drain signal line DL in the running direction. The reason that such a constitution is adopted is explained later.

Further, the source electrode SD2 is integrally formed with the pixel electrode PX which is formed in the inside of the pixel region.

That is, the pixel electrode PX is constituted of a group consisting of a plurality (two pieces in the drawing) of electrodes which extend in the y direction and are arranged in parallel in the x direction in the inside of the pixel region. Among a group of these pixel electrodes PX, one end of one pixel electrode PX also functions as the source electrode SD2, while the other end portion of the pixel electrode PX is electrically connected to the corresponding other portion of the other pixel electrode PX.

Although not shown in the drawing, at interfaces between the semiconductor layer AS and the drain electrode SD1 as well as the source electrode SD2, thin layers which are doped with impurities of high concentration are formed and these layers function as contact layers.

These contact layers may be formed such that, for example, impurity layers of high concentration are already formed on the surface of the semiconductor layer SD at the time of forming the semiconductor layer SD, and using patterns of the drain electrode SD1 and the source electrode SD2 formed on an upper surface of the semiconductor layer SD as masks, the impurity layers which are exposed from the patterns are etched.

On the surface of the transparent substrate SUB1 on which the thin film transistors TFT, the drain signal lines DL, the drain electrodes SD1, the source electrodes SD2 and the pixel electrodes PX are formed, a protective film PSV (see FIG. 1 and FIG. 4) is formed. This protective film PSV is a film which is provided for obviating the direct contact between the thin film transistors TFT and the liquid crystal so as to prevent the deterioration of characteristics of the thin film transistors TFT.

Here, the protective film PSV is constituted of a sequentially laminated body consisting of a protective film PSV1 which is made of an inorganic material layer such as SiN and a protective film PSV2 which is formed of an organic material layer made of resin or the like. The reason that the protective film PSV2 which is made of the organic material layer is used as the protective film PSV in this manner is that the protective film PSV2 can reduce the dielectric constant of the protective film PSV per se.

Accordingly, it is needless to say that the protective film PSV may be wholly constituted of the organic material layer without using the inorganic material layer in part.

The counter electrodes CT are formed on an upper surface of the protective film PSV. Each counter electrode CT is constituted of a group consisting of a plurality of electrodes (three electrodes in the drawing) which extend in they direction and are arranged in parallel in the x direction in the same manner as the above-mentioned pixel electrode PX. Further, these respective electrodes are positioned between the pixel electrodes PX when viewed as a plan.

That is, the counter electrodes CT and the pixel electrodes PX are respectively arranged equidistantly in the order of the counter electrode CT, the pixel electrode PX, the counter electrode CT, the pixel electrode PX, . . . , counter electrode CT from the drain signal line DL at one side to the drain signal line DL at the other side.

Here, the counter electrodes CT which are positioned at both sides of the pixel region have portions thereof formed such that the portions are overlapped to the drain signal lines DL and, at the same time, the counter electrodes CT are formed in common with the corresponding counter electrodes CT in the neighboring pixel regions.

In other words, the counter electrodes CT are overlapped to the drain signal lines DL such that the central axes of the drain signal lines DL are substantially aligned with the center axes of the counter electrodes CT and a width of the counter electrodes CT is set larger than a width of the drain signal lines DL. The counter electrode CT disposed at the left side with respect to the drain signal line DL constitutes one of respective counter electrodes CT of the left-side pixel region, while the counter electrode CT at the right side constitutes one of respective counter electrodes CT of the right-side pixel region.

By forming the counter electrodes CT having a width wider than that of the drain signal lines DL over the drain signal lines DL in this manner, it is possible to obtain an advantageous effect that lines of electric forces from the drain signal lines DL terminate at the counter electrodes CT and the termination of lines of electric forces to the pixel electrodes PX can be prevented. This is because that when the lines of electric forces from the drain signal lines DL terminate at the pixel electrodes PX, this gives rise to noises.

Respective counter electrodes CT each of which is constituted of a group of electrodes are integrally formed with counter voltage signal lines CL made of the same material as the counter electrode CT. The counter voltage signal lines CL are formed such that the counter voltage signal lines CL sufficiently cover the gate signal lines GL. The reference voltage is supplied to the counter electrodes CT through these counter voltage signal lines CL.

Here, the counter electrodes CT and the counter voltage signal lines CL may be formed of a non-light-transmitting material such as a metal layer or a light transmitting material such as ITO (Indium Tin Oxide), ITZO (Indium Tin Zinc Oxide), IZO (Indium Zinc Oxide) or the like, for example.

The counter voltage signal line CL is formed such that the counter voltage signal line CL sufficiently covers the gate signal line GL. The counter voltage signal line CL has a portion which is projected from the gate signal line GL. Below such a projected portion of the counter voltage signal line CL, a connecting portion with each pixel electrode PX is positioned. Due to such a constitution, a capacitive element Cstg which uses the insulation film GI and the protective film PSV as dielectric films is formed between the pixel electrode PX and the counter voltage signal line CL.

The capacitive element Cstg is provided with a function of storing video signals supplied to the pixel electrode PX for a relatively long period or the like, for example.

Then, on the upper surface of the transparent substrate SUB1 on which the counter electrodes CT are formed, an orientation film ORI1 is formed such that the orientation film ORI1 also covers the counter electrodes CT. The orientation film ORI1 is a film which comes into direct contact with the liquid crystal and determines the initial orientation direction of molecules of the liquid crystal with a rubbing formed on a surface thereof.

As shown in FIG. 3, respective pixel electrodes PX and counter electrodes CT are constituted such that they have a plurality of bent portions in the longitudinal direction so as to form a zigzag pattern. That is, the liquid crystal display device adopts a so-called multi-domain method.

That is, even when the liquid crystal has the same molecular arrangement state, the polarization state of the transmitting light is changed in response to the incident direction of light incident to the liquid crystal display panel and hence, the transmissivity of light is changed in response to the incident direction.

When a viewing point is inclined obliquely with respect to the viewing angle direction, such a viewing angle dependency of the liquid crystal display panel induces a luminance inverting phenomenon so that the liquid crystal display device exhibits the display characteristics that images are colored in color display.

Accordingly, using an imaginary line which connects the bent points of respective electrodes as a boundary and the direction of the electric field which acts between respective electrodes is made different from each other between one region and the other region so that it is possible to compensate for the coloring of images depending on the viewing angle.

In the liquid crystal display device having such a constitution, each drain signal line DL has a trapezoidal cross-section in which tapers which are gradually widened toward a ground layer side are formed on respective side wall surfaces which are arranged parallel to the longitudinal direction.

Further, the drain signal lines DL are sufficiently covered with the counter electrodes CT which are formed over the drain signal lines DL by way of the protective film PSV.

Figure 5:
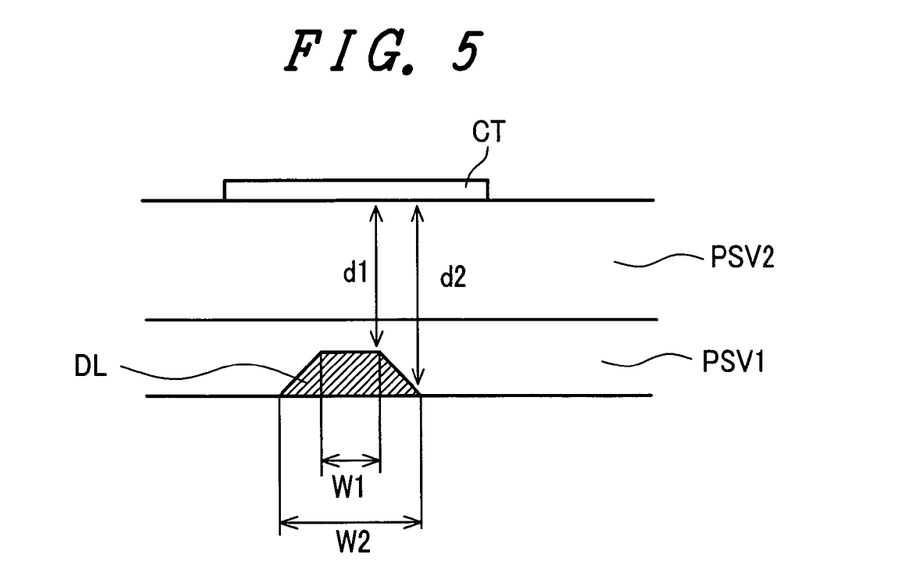
FIG. 5 is a cross-sectional-view showing one embodiment of an essential part of a pixel of the liquid crystal display device according to the present invention.

Based on the above-mentioned constitution, as shown in FIG. 5, assuming a distance from a top portion of the drain signal line DL to the counter electrode CT as d1, a distance from the side wall faces of the drain signal line DL to the counter electrode CT becomes d2 and this value is larger than d1.

This implies that under the restriction that a film thickness of the protective film PSV must be set to a given thickness, under the restriction that a cross-sectional area of the drain signal line DL must be set to a given value in view of the necessity for setting an electric resistance value of the whole drain signal line DL, and under the restriction that the width of the drain signal line DL must be set to a given value to enhance the numerical aperture of the pixel region, the capacitance between the drain signal line DL and the counter electrode CT can be reduced.

That is, to reduce the capacitance between the drain signal line DL and the counter electrode CT, first of all, an idea to increase the thickness of the protective film PSV is considered. However, corresponding to the increase of the thickness of the protective film PSV, the strength of electric field between the pixel electrode PX and the counter electrode CT is decreased and hence, the driving voltage must be increased. Accordingly, the increase of the thickness of the protective film PSV is restricted. Further, there may be considered an idea in which the width of the drain signal line DL is increased corresponding to the decrease of the film thickness of the drain signal line DL so as to reduce the capacitance between the drain signal line DL and the counter electrode CT while ensuring the electric resistance value of the drain signal line DL. In this case, however, along with the increase of the width of the drain signal line DL, it becomes necessary to increase the width of the counter electrode CT (since the counter electrode CT has a so-called shielding function) and hence, the numerical aperture of the pixel region is reduced.

In view of the above, when the cross-sectional area of the drain signal line DL is set with respect to the constitution of the drain signal line DL, it is effective to reduce the width $W_1$ of the top surface with respect to the width $W_2$ of the bottom surface. This is because that a region where the distance from the side wall surface of the drain signal line DL to the counter electrode CT is d2 (>d1) becomes larger than a region where the distance from the top surface of the drain signal line DL to the counter electrode CT is d1 with respect to area.

Also in this case, it is needless to say that the width $W_2$ of the bottom surface of the drain signal line DL is restricted by a given numerical aperture which is to be obtained by the pixel region.

Embodiment 2

Figure 6A:
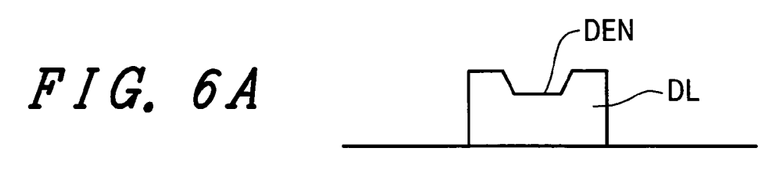
FIG. 6 is a cross-sectional view showing another embodiment of a drain signal line of the liquid crystal display device according to the present invention.
Figure 6B:
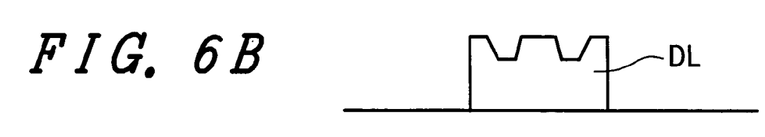
Figure 6C:
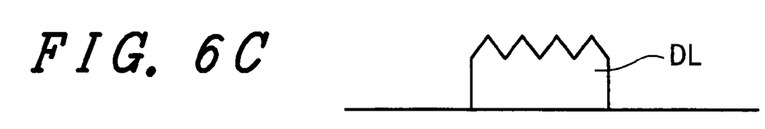

In view of the gist of the invention described in the embodiment 1, the cross-sectional shape of the drain signal line DL is not always limited to the trapezoidal shape. For example, as shown in FIG. 6(a), a recessed portion DEN which is extended along the longitudinal direction of the drain signal line DL may be formed on the top surface of the drain signal line DL. Further, as shown in FIG. 6(b), the number of the recessed portion DEN is not limited to 1 but can be set to a plural number. Still further, a cross-sectional shape of the recessed portion DEN is not limited and may be a triangular shape as shown in FIG. 6(c).

That is, provided that the surface of the drain signal line DL which faces the counter electrode CT has at least two regions where the distance from the counter electrode CT differs from each other, the same advantageous effect can be obtained.

Embodiment 3

Figure 7:
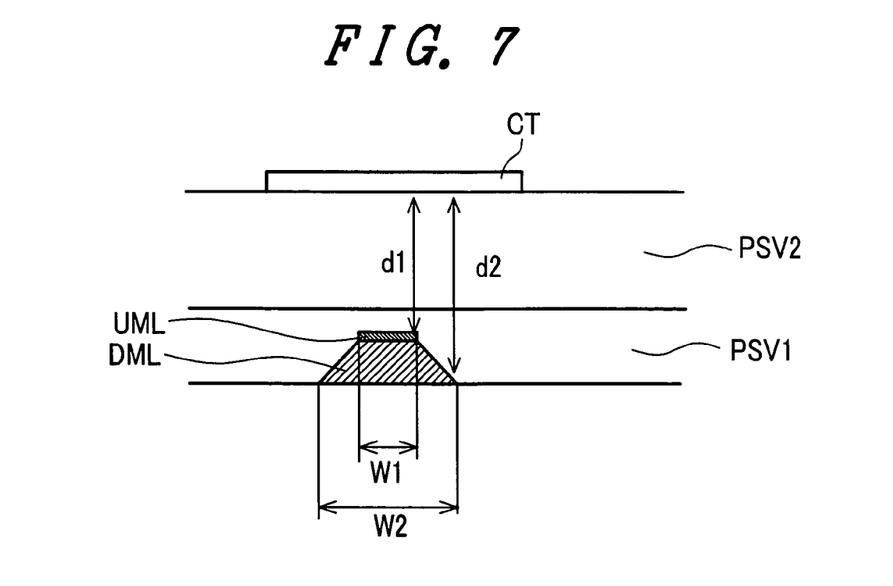
FIG. 7 is a cross-sectional view showing one embodiment of an essential part of a pixel of the liquid crystal display device according to the present invention.

FIG. 7 is a constitutional view showing another embodiment of the liquid crystal display device according to the present invention and corresponds to FIG. 5.

The constitution which makes this embodiment differ from the embodiment shown in FIG. 5 lies in that the drain signal line DL has a two-layered structure, wherein tapers are formed on side wall faces of a metal layer DML which constitutes a lower layer by making use of a metal layer UML which constitutes an upper layer.

Here, as a material of the metal layer which constitutes the upper layer, Mo, Cr, MoW, MoCr, Ti, CoMo or the like can be selected, for example. On the other hand, as a material of the metal layer which constitutes the lower layer, Al, AlNd, AlSi, AlTa, AlTiTa, Cr or the like can be selected, for example.

FIG. 8 is a flow chart showing one embodiment of a manufacturing method of the above-mentioned drain signal line.

Figure 8A:
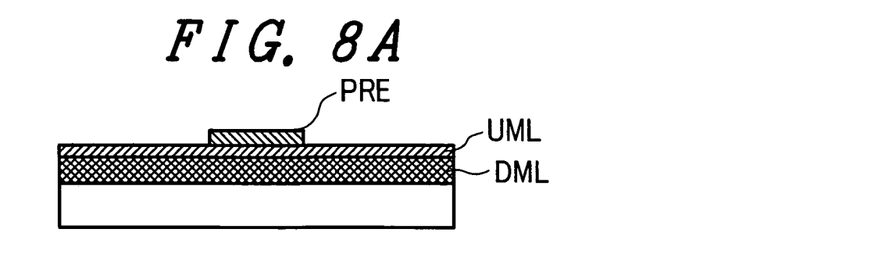
FIG. 8 is a flowchart showing one embodiment of a manufacturing method of a liquid crystal display device according to the present invention.

First of all, as shown in FIG. 8(a), to form the drain signal line DL, a metal layer DML which constitutes a lower layer and a metal layer UML which constitutes an upper layer are formed sequentially on an upper surface of a ground layer. In this case, the metal layer UML which constitutes the upper layer is made of a material which exhibits a faster etching rate than a material of the metal layer DML which constitutes the lower layer.

Then, a photo resist film PRE is formed on a whole region of a surface of the metal layer UML which constitutes the upper layer and the photo resist film PRE is made to remain on a region where the drain signal line DL is to be formed using a well-known photolithography technique.

Figure 8B:
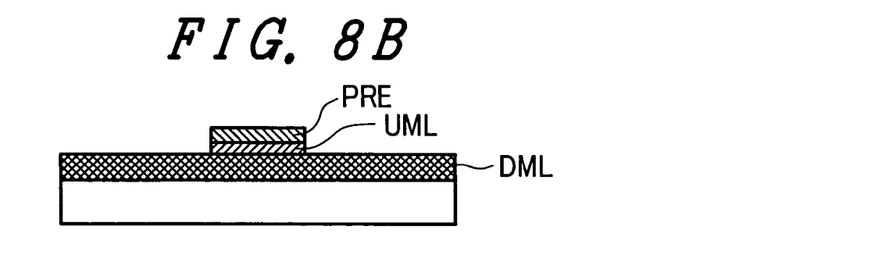

Subsequently, as shown in FIG. 8(b), using the remaining photo resist film PRE as a mask, the metal layers UML, DML which constitute the upper layer and the lower layer are collectively etched.

First of all, the metal layer UML which constitutes the upper layer is selectively etched so as to expose a surface of the metal layer DML which constitutes the lower layer.

Figure 8C:
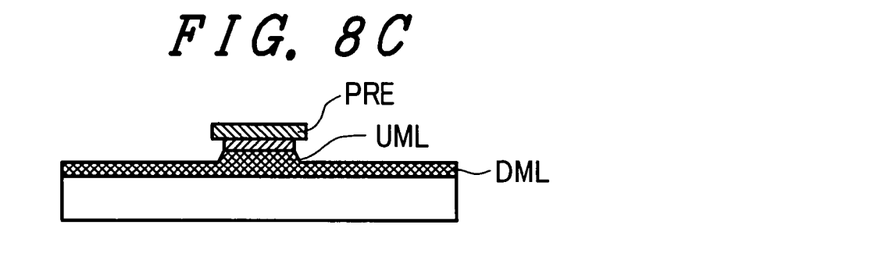
Figure 8D:
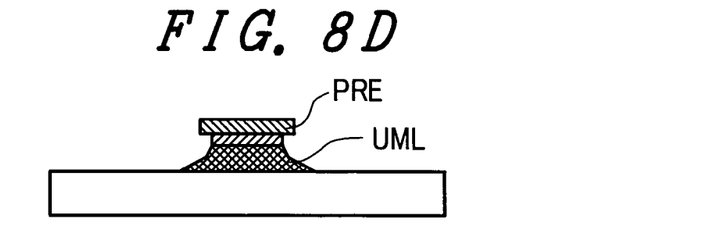

Then, as shown in FIG. 8(c), the metal layer DML which constitutes the lower layer is etched. The etching is performed, as shown in FIG. 8(d), until a surface of the ground layer is exposed.

In this case, on side wall faces of the metal layer DML which constitutes the lower layer which remains below the photo resist film PRE, tapers which are flared toward the ground layer side are formed.

Figure 8E:
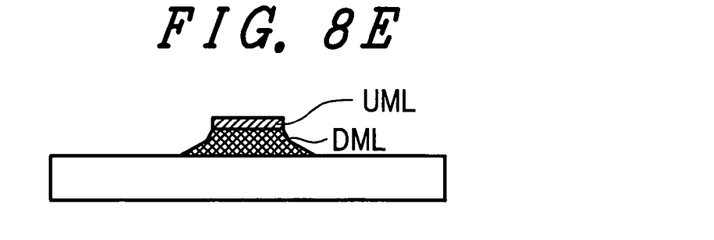

Thereafter, as shown in FIG. 8(e), by removing the photo resist film PRE completely, the formation of the drain signal line DL is completed.

Embodiment 4

Figure 9:
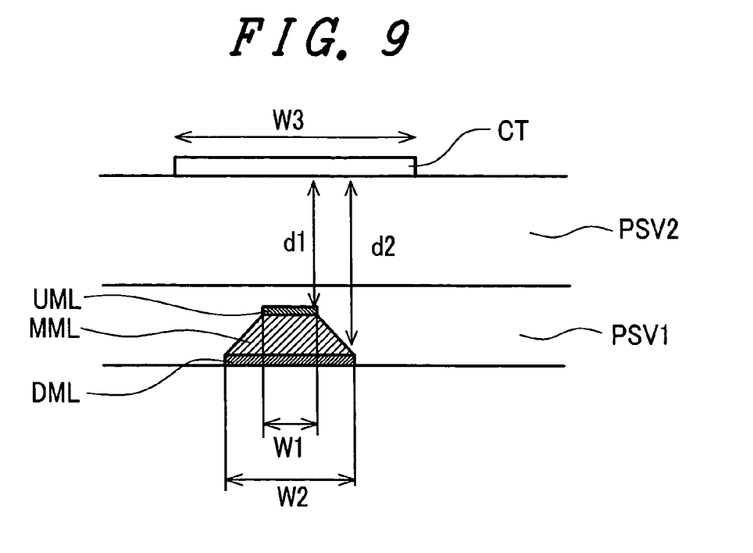
FIG. 9 is a cross-sectional view showing one embodiment of an essential part of a pixel of the liquid crystal display device according to the present invention.

FIG. 9. is a constitutional view showing another embodiment of the liquid crystal display device according to the present invention and corresponds to FIG. 5.

The constitution which makes this embodiment differ from the embodiment shown in FIG. 5 lies in that a drain signal line is constituted of a metal layer having a three-layered structure, wherein a width of a metal layer DML which constitutes a lower most layer is set to $W_2$, a width of a metal layer UML which constitutes an uppermost layer is set to $W_1$ ($W_2 > W_1$) and a width of a metal layer MML which constitutes an intermediate layer is changed from W2 to W1 in the direction from the side of the metal layer DML which constitutes the lowermost layer to the side of the metal layer UML which constitutes the uppermost layer thus forming tapers.

The metal layer MML which constitutes the intermediate layer is constituted of Al or an Al alloy, while other metal layers UML, DML are constituted of metal or an alloy thereof other than Al or the Al alloy.

In this case, it is preferable that other metal layers UML, DML are constituted of metal or an alloy thereof which can suppress the oxidation of Al or the alloy thereof. This is because that Al or the alloy thereof is liable to be easily oxidized and the connection resistance at an input terminal portion of the drain signal line is increased and this may cause the distortion of waveforms of the video signals.

Embodiment 5

Figure 10:
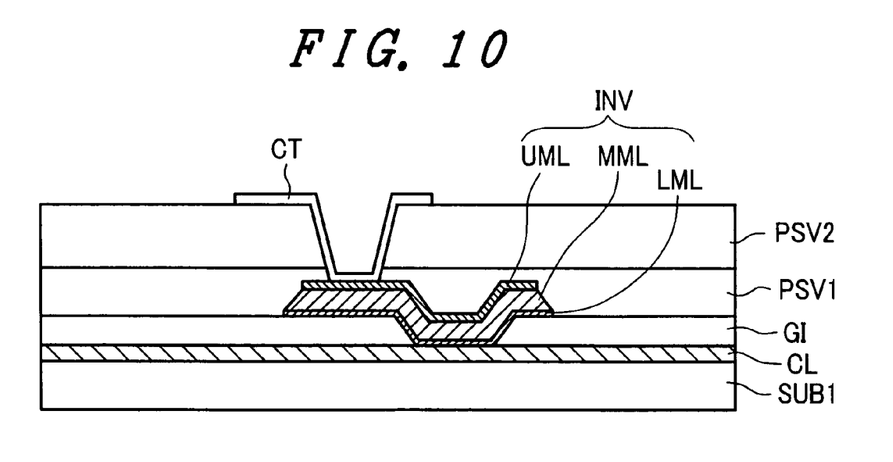
FIG. 10 is a cross-sectional view showing another embodiment of the pixel of the liquid crystal display device according to the present invention.

FIG. 10 is a constitutional view showing another embodiment of the liquid crystal display device according to the present invention and corresponds to a cross-sectional view taken along a line X—X in FIG. 3.

In this embodiment, the drain signal line DL adopts a three-layered structure in the same manner as the embodiment 4 and, at the same time, an interlayer INV which is served for connecting the counter voltage signal line CL and the counter electrode CT is formed simultaneously with the formation of the drain signal line DL.

Here, the interlayer INV is constituted of a laminated structure constituted of metal layers equal to those of the drain signal line DL. In this case, respective metal layers UML, DML which constitute an uppermost layer and a lowermost layer may be respectively selected aiming at the enhancement of contacts between them and the counter electrode CT and the counter voltage signal line CL.

For example, respective metal layers DML, UML constituting the uppermost layer and the lowermost layer are formed of MoZr, wherein it is desirable that an amount of Zr is smaller than an amount of Mo. To be more specific, it is preferable that the composition is set to Mo-8 wt % Zr. Further, an intermediate layer is formed of AlNd, wherein it is desirable that an amount of Nd is smaller than an amount of Al. To be more specific, it is preferable that the composition is set to Al-9.8 wt % Nd.

Further, it is also possible to obtain the same advantageous effect by using a so-called rare-earth element in place of Zr or Nd.

Further, it is preferable that the film thicknesses of respective metal layers UML, DML which constitute the uppermost layer and the lowermost layer are smaller than the thickness of the metal layer MML which constitutes the intermediate layer. This is because that such a structure can enhance the reduction of resistance and the capacitance reduction effect due to the shape. In view of the above, it is preferable that the film thickness of the metal layer MML constituting the intermediate layer is set to a value which is equal to or more than four times the film thickness of the metal layer UML which constitutes the uppermost layer.

Embodiment 6

Figure 11:
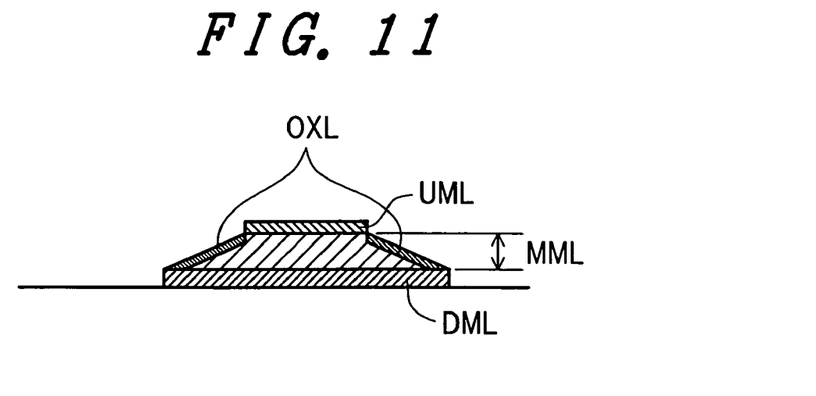
FIG. 11 is a cross-sectional view showing another embodiment of the drain signal line of the liquid crystal display device according to the present invention.

This embodiment shows a modification of the drain signal line DL having the three-layered structure shown in FIG. 5. This embodiment is, as shown in FIG. 11, characterized in that oxide films OXL are formed on tapered surfaces. This provision is made for preventing a phenomenon that when the metal layer MML which constitutes the intermediate layer made of Al or an alloy thereof is exposed, a hillock occurs from the metal layer MML.

Accordingly, it is possible to prevent the occurrence of a phenomenon that the line resistance which constitutes the intermediate layer is oxidized as time lapses and the line resistance of the drain signal lines DL is changed whereby the reliability of the liquid crystal display device is enhanced.

Here, the oxide films OXL can be formed by following methods. First of all, by bringing the drain signal line DL having a three-layered structure which forms tapers on the side wall faces thereof into an oxygen plasma treatment, the oxide films OXL can be formed on the tapered side wall faces. In this case, it is preferable to use non-Al based metal as a material of the metal layer UML which constitutes the uppermost layer. This is because that the non-Al based metal can prevent the increase of connection resistance.

As another method, a so-called anodizing processing is performed. That is, after forming the drain signal lines DL each having the three-layered structure which uses an Al-based metal layer as the intermediate layer and forms tapers at side wall faces thereof on the substrate, the substrate is immersed into an electrolytic solution. Here, the drain signal line DL constitutes an anode and a metal plate which constitutes a cathode is simultaneously immersed into the electrolytic solution. Then, by supplying electricity to the anode and the cathode, the anodic oxide films OXL are formed on the tapered side wall faces. Also in this case, it is preferable that the material of the metal layer UML which constitutes the uppermost layer is formed of non-Al based metal.

Further, as still another method, by heating the drain signal line DL having the three-layered structure which forms tapers on side wall faces thereof under atmosphere where oxygen is present, thermally oxidized films are formed on the side wall faces. In this case, it is desirable that heating is performed at a temperature of not more than 100 degree centigrade.

Due to such heating, it is possible to alleviate stress generated in the inside of the drain signal line DL having a multi-layered structure. This implies that the disconnection due to stress which occurs with respect to the drain signal line DL after use of the drain signal line DL for a long period can be decreased.

This method can be used simultaneously with the above-mentioned two other methods. This is because that by adding the heating step, the stress generated in the inside of the drain signal line DL can be alleviated.

Embodiment 7

Figure 12:
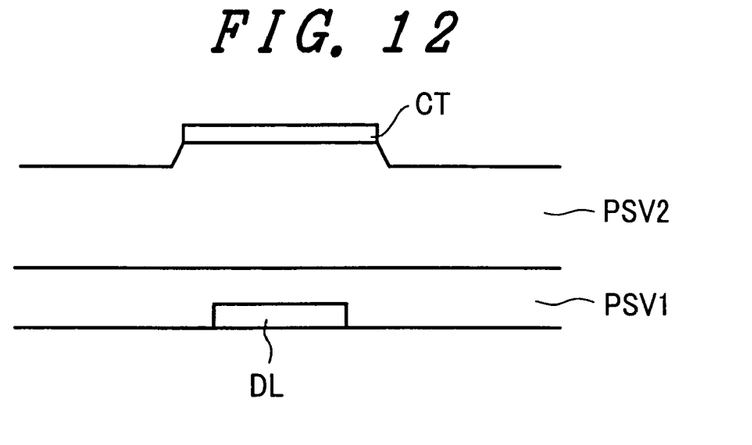
FIG. 12 is a cross-sectional view showing another embodiment of the pixel of the liquid crystal display device according to the present invention.

This embodiment adopts a structure in which, while the drain signal lines DL maintain the rectangular cross section as it is as in the case of conventional liquid crystal display device as shown in FIG. 12, recessed portions are formed in regions on a surface of the protective film PSV which constitutes the ground layer for the counter electrodes CT above the drain signal lines DL except for regions where the counter electrodes CT (at least the counter electrodes CT which are overlapped to the drain signal lines) are formed.

Such protective film PSV can be formed without increasing the number of steps using a photolithography technique which adopts a so-called half exposure method.

Also due to such a constitution, the distance between the drain signal line DL and the counter electrode CT can be increased and hence, the capacitance between the drain signal line DL and the counter electrode CT can be reduced.

Embodiment 8

Figure 13:
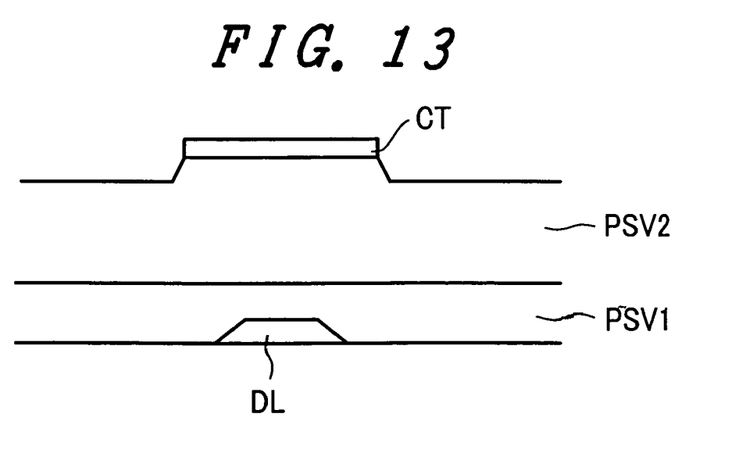
FIG. 13 is a cross-sectional view showing another embodiment of the pixel of the liquid crystal display device according to the present invention.

This embodiment, as shown in FIG. 13, premises the constitution shown in the embodiment 7, wherein tapers are formed on side wall faces of the drain signal line DL. Due to such a constitution, the capacitance generated between the drain signal line DL and the counter electrode CT can be further reduced.

Also in this case, the drain signal line DL may be constituted in a multi-layered structure to obtain the advantageous effects described in the above-mentioned embodiments.

Embodiment 9

Although the present invention has been explained by focusing on the drain signal lines DL in the above-mentioned respective embodiments, it is needless to say that the present invention is not limited to the drain signal lines DL and is applicable to the gate signal lines GL.

This is because that when the counter voltage signal lines CL which are connected to the counter electrodes CT are present over the gate signal lines GL, the capacitance between them becomes undesirable and there arises the same situation as in the case of the drain signal lines DL.

Embodiment 10

In the above-mentioned embodiments, with respect to the drain signal lines DL and the gate signal lines GL, the tapers formed on side wall faces are formed on side wall faces of respective sides extending in the running direction of the signal lines. However, it is needless to say that the present inventions are not limited to such taper formation and are applicable to the taper formation in which the taper is formed on one of side wall faces.

As can be clearly understood from the foregoing explanations, according to the liquid crystal display devices of the present inventions, the capacitance of the drain signal lines with respect to the counter electrodes can be reduced, for example.

What is claimed is:

1. A device comprising:
   an upper conductive element, an insulating element, a lower conductive element formed on a same substrate, the insulating element being arranged between the upper conductive element and the lower conductive element;
   wherein a number of layers which form the upper conductive element is smaller than a number of layers which form the insulating element, the number of layers which form the insulating element is smaller than a number of layers which form the lower conductive element,
   the upper conductive element is thinner than the lower conductive element, an insulating layer of the insulating element arranged at the upper conductive element side is thicker than an insulating layer of the insulating element arranged at the lower conductive element side, and
   the lower conductive element include a layer thicker than the upper conductive element and a layer thinner than the upper conductive element.

2. A device according to claim 1, wherein the device is a display device.

3. A device according to claim 2, wherein the device is a liquid crystal display device.

4. A device according to claim 3, wherein the lower conductive element is a drain signal line and the upper conductive element is a counter electrode.

5. A device according to claim 1, wherein the lower conductive element has a larger taper angle than a taper angle of the upper conductive element.

6. A device according to claim 3, wherein the lower conductive element has a larger taper angle than a taper angle of the upper conductive element.

7. A device according to claim 1, wherein the upper conductive element and the lower conductive element have an overlapping portion with the insulating element therebetween.

8. A device according to claim 7, wherein the device is a display device.

9. A device according to claim 8, wherein the device is a liquid crystal display device.

10. A device according to claim 9, wherein the lower conductive element is a drain signal line and the upper conductive element is a counter electrode.

11. A device according to claim 7, wherein the lower conductive element has a larger taper angle than a taper angle of the upper conductive element.

12. A device according to claim 8, wherein the lower conductive element has a larger taper angle than a taper angle of the upper conductive element.

13. A device according to claim 1, wherein the lower conductive element includes one layer thicker than the upper conductive element and two layers thinner than the upper conductive element.

14. A device according to claim 9, wherein the lower conductive element includes one layer thicker than the upper conductive element and two layers thinner than the upper conductive element.

15. A device according to claim 1, wherein the insulating element is wider than the upper conductive element and the upper conductive element is wider than the lower conductive element.

16. A device according to claim 9, wherein the insulating element is wider than the upper conductive element and the upper conductive element is wider than the lower conductive element.

* * * * *